(No Model.)
F. E. MELLINGER.
WEIGHING SCALE.
No. 577,516. Patented Feb. 23, 1897.
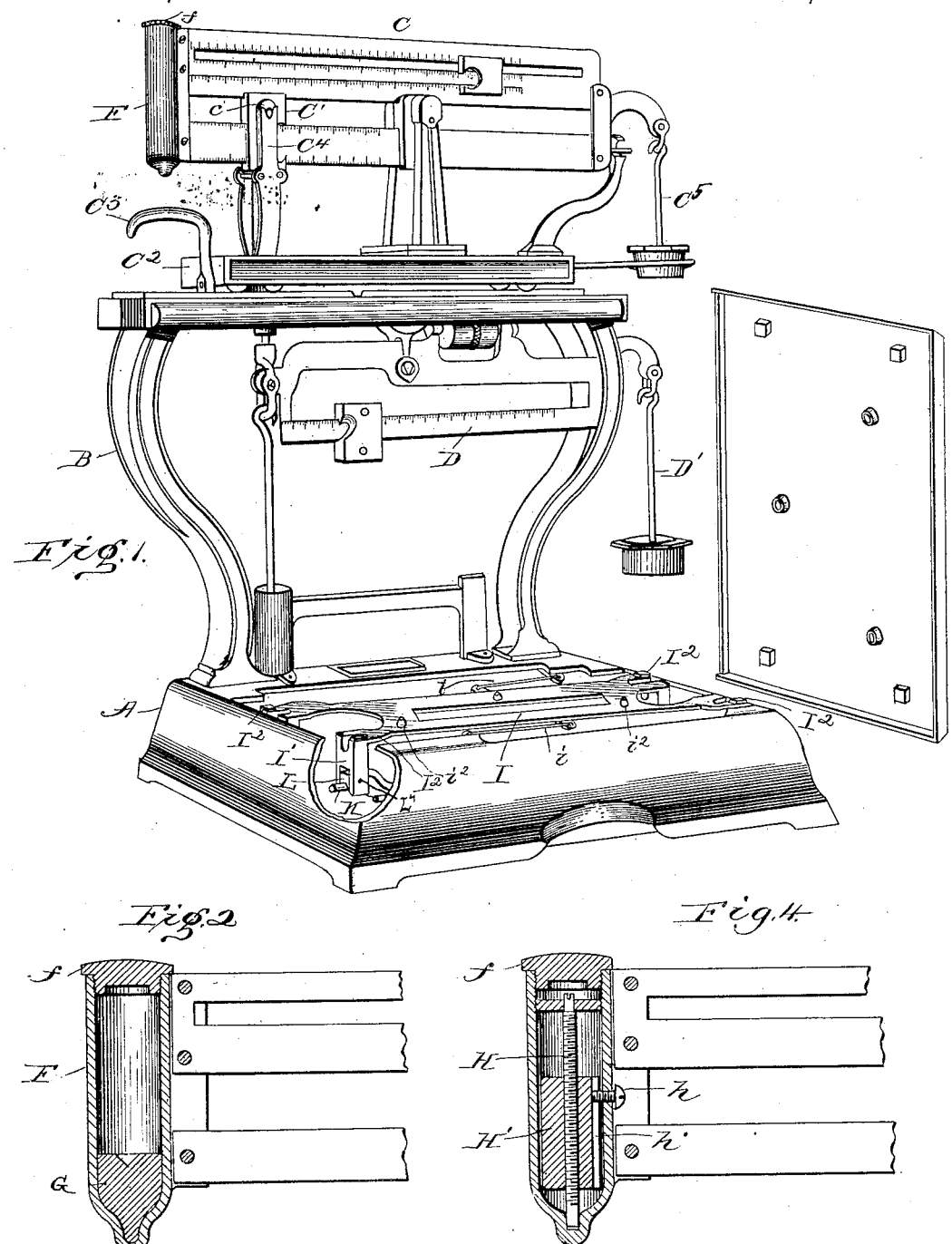
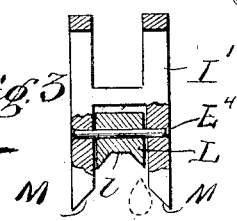
Witnesses:
J. M. Fowler Jr.
Alex Stewart
Inventor
Frank E. Mellinger
by Church & Church
his Attorneys

UNITED STATES PATENT OFFICE.

FRANK E. MELLINGER, OF DAYTON, OHIO, ASSIGNOR TO THE COMPUTING SCALE COMPANY, OF SAME PLACE.

WEIGHING-SCALE.

SPECIFICATION forming part of Letters Patent No. 577,516, dated February 23, 1897.

Application filed August 20, 1895. Serial No. 559,942. (No model.)

*To all whom it may concern:*

Be it known that I, FRANK E. MELLINGER, of Dayton, in the county of Montgomery, State of Ohio, have invented certain new and useful Improvements in Weighing-Scales; and I do hereby declare the following to be a full, clear, and exact description of the same, reference being had to the accompanying drawings, forming a part of this specification, and to the letters of reference marked thereon.

This invention relates to improvements in weighing-scales, the invention being more especially, though not exclusively, applicable to computing-scales, the objects being, first, to secure a more perfect gravity adjustment for the beam which cannot be tampered with by unskilled persons, and, secondly, to provide an improved means for supporting the platform whereby the assembling of the parts is facilitated and the manufacture simplified.

The invention consists in certain novel details of construction and combinations and arrangements of parts, all as will be now described, and pointed out particularly in the appended claims.

Referring to the accompanying drawings, Figure 1 is a perspective view of a scale with portions broken away and the platform turned up on edge to show the improvements. Figs. 2 and 3 are detail sectional views. Fig. 4 is a detail section showing a modification.

Like letters of reference in the several figures denote the same parts.

The scale illustrated is of the ordinary form of computing or price scale now on the market, and I will not describe the construction of the same further than to say that A indicates the base for the platform and its levers, and B the upright for the beams or indicating mechanism, which latter in the form shown consists, first, of a computing-beam C, with means for varying the distance between its pivotal point and the head-block $C'$, through which the motion of the platform-levers is transmitted to the beam, and, secondly, of a weighing-beam D, pivoted in fixed relation to the platform-lever connection E.

The distance between the head-block and pivot of the computing-beam is varied by mounting the beam on a carriage $C^2$, moved by handle $C^3$, and providing a stop-rest $C^4$ for the knife-edge bearings $C''$ of the head-block. At the free ends both beams carry the usual pendulous counterweight-supports $C^5$ and $D'$.

The computing-beam in this scale and in all other scales where the beam or lever is balanced on its pivots must have its center of gravity slightly above its line of pivots, so as to have a small excess of weight below the line of pivots of said beam or lever, and thus give the proper degree of sensitiveness and stability to the movement of said beam.

It is common in scale beams or levers to so adjust their centers of gravity vertically with relation to their pivots by setting said pivots slightly below the center of gravity of the beam as that the beam will be neither too sluggish nor too unstable, and to readily and cheaply secure this adjustment when the beams or levers are manufactured in quantities. It is customary to provide each beam with what is known as an "adjustable gravity-weight"—in other words, a weight the adjustment of whose vertical height changes the center of gravity which determines the stability of the beam. Ordinarily this adjustment is only necessary when the scale is first set up, requiring the services of an expert to secure a proper balance of each beam; but inasmuch as the weight is in a most exposed position, when any slight difficulty occurs, requiring, for instance, the adjustment of the tare-weight, the inexperienced person tries to overcome the difficulty by adjusting the gravity-weight, the result being that the services of an expert are required to readjust the scale.

In my present invention I have entirely overcome this difficulty and provided a means whereby an expert understanding the scale may at once make the proper adjustment for gravity, but at the same time the adjusting means is entirely removed from observation and, if desired, may be made of such character as to be incapable of adjustment without special mechanism, and for this purpose I provide on the rear end of the computing-beam a vertically-arranged chamber or casing F. The chamber is perfectly cylindrical, with its longitudinal center in this instance at right angles to the longitudinal center of the beam, as shown clearly in Figs. 2 and 4, the top, if desired, being closed by a screw-cap $f$.

In the preferred manner of adjusting the gravity of the beam so as to so adjust the right weight above the pivotal center, previously-shaped ingots or portions of cold lead or other soft metal are driven into this chamber, as shown at G, Fig. 2, (or melted lead poured therein,) until the proper point is reached, or, if desired, a greater quantity of lead than is necessary is driven or poured in and the surplus bored out. Thus the beams may be manufactured in quantity and subsequently balanced accurately in this manner.

It is also obvious that instead of filling the chamber F with more or less lead or other soft metal to obtain the proper gravity adjustment of each beam or lever the casing or chamber F may be cast in the first place with more metal in its bottom than is required and then drilling or otherwise removing the surplus in properly adjusting the gravity of each beam or lever.

In every instance there must exist a capability of varying the center of gravity of the weight in a vertical direction and the use of the words "vertically adjustable" or equivalent in the claims is intended to mean having the capability of vertical variation of its center of gravity.

Although I have shown in this particular instance the chamber or casing F arranged vertically upon the beam, it is merely to perform the additional function of rigidly uniting the upper and lower graduated members of the beam, it being clear that the function of adjusting the gravity of the beam or lever with relation to its line of pivots will be equally performed if the casing or chamber F be arranged substantially parallel to and either above or below the line of pivots on said beam or lever.

While I prefer to employ lead, it is obvious that an adjustable weight may be employed, as illustrated, for instance, in Fig. 4, wherein H indicates a vertical screw journaled in the chamber and having working upon it a weight H', held against rotation by a small set-screw $h$, working in a spline $h'$ in the weight. The end of the screw H may be provided with a slot for a screw-driver and covered in or closed by the cap, as in the first instance. Whatever the form of the weight employed be, it should be of such character as to prevent any possible shifting from one side or the other of the chamber, and for this reason it is preferable to drive in previously-shaped ingots of soft metal or pour in melted lead or employ a sliding weight, as shown.

When the gravity of the beam or lever has been properly adjusted by employing weight in the chamber F in either of the ways heretofore described, the cap $f$ is tightly screwed into the open mouth of said chamber with a pair of pipe-tongs or other tool, and thus securely seals said chamber to prevent manipulation by unskilled persons as well as those bent upon fraudulent and wrongful acts.

From the foregoing it is apparent that in its broader scope this feature of the present improvement consists in and anticipates the employment of a casing or chamber located upon the scale beam or lever, a means for adjusting the gravity of said beam and located within said chamber, and a means for sealing the opening to said chamber.

In the practical manufacture of these scales it is found that the parts may all be manufactured of a standard gage, except the platform, which must be made to suit the individual customer, and in order to make provision for allowing of the manufacture and assembling of the parts for the purposes of testing before it is determined what particular style of platform is to be furnished, that is to say, whether an iron or marble platform or a platform of usual character, I propose to employ what I shall term the "platform-subbase," which consists, essentially, of a spider or frame I, arranged immediately beneath the platform and having at its four corners downwardly-extending bifurcated legs $l'$ and upwardly-extending leveling-lugs $l^2$, which are adapted to support and level the platform. These leveling-lugs upon which the platform rests are adapted to be slightly filed in order to secure a perfectly true set for the platform on the subbase, and this may be done at the last moment and the variations in the balance compensated for by the adjustment of the tare-weight or by the adjustment of the amount of shot in the pendulous counterweight-support on the weighing-beam. As a matter of convenience, this subbase is held against lateral movement by hooks $i$ at front and rear, and the platform is positioned and held against lateral movement on the subbase by upwardly-projecting lugs or pins $i^2$ entering corresponding openings in the under side of the platform.

The platform-levers are provided with the usual laterally-projecting knife-edge bearings K for supporting the platform or its subbase, and for coöperation with these knife-edge bearings it is necessary to provide hardened-steel V-shaped bearings in the downwardly-extending legs, whether they be connected with the platform or its subbase. These hardened-steel bearings in the accompanying drawings I letter L, and they are loosely mounted upon a rigid pin $L^4$ and between the arms of the downwardly-extending legs $l'$ of the subbase, so as to render said bearings L capable of a pivotal movement in the direction of the length of the knife-edge bearings. Thus they adjust themselves automatically in this direction to prevent any undue binding or twisting action when a weight is thrown on the platform. In assembling the parts, however, when thus constructed, it is found, particularly where the parts are assembled by unskilled persons, that the knife-edge bearings are apt to be seated, not in the apex of the V-shaped bearings, but in the edges of the bearings, and in order to prevent this in the present structure and to insure the proper entry of the knife-edge bearings when the parts are assembled the bifurcated arms of the legs are extended below the bearings some distance, and their inner sides are beveled at M at such an angle as that a projection of the plane of the incline would strike beyond the center of the V-shaped bearings. Thus the knife-edge bearing as it moves into place, even should it strike one of the inclined faces of the supporting-arm, will drop off of the same directly into the V-shaped bearing without danger of catching between the edge of the same and supporting-arm, as will be readily understood by an inspection of Fig. 3, wherein the knife-edge bearing is shown in dotted lines as just passing off of the incline and into the V-shaped bearing.

To compensate for any possible inequality in the distance between the front and rear knife-edge bearings, the V-shaped bearings at one side of the subbase have a flattened bearing-surface, as shown at $l$. With this construction the parts may be assembled by an unskilled person without danger of wrong adjustment, which fact will be appreciated when it is remembered that the scales are shipped with the various levers and other parts dismounted and packed separately, so as to be safe against possible breakage.

The employment of the platform-subbase enables the manufacturer to keep the scales practically complete in stock and at very short notice to fit up the platform in the style desired by the purchaser.

Having thus described my invention, what I claim as new is—

1. In a scale, the combination with the beam, of a vertically-arranged chamber or casing rigidly mounted thereon with means for closing the same and a gravity-weight located within said chamber whereby the sensitiveness of the balance of the beam may be adjusted and adapted to have its center of gravity varied vertically; substantially as described.

2. In a scale, the combination with the balanced beam, of a casing having a chamber therein with its longitudinal axis at right angles to the longitudinal axis of the beam, with means for closing said chamber and a gravity-weight located in said chamber in fixed position whereby the sensitiveness of the balance of the beam may be secured but adapted to have its center of gravity varied vertically; substantially as described.

3. In a scale, the combination with the beam, of the vertically-arranged casing or chamber on said beam, and the solid soft-metal gravity-weight in said chamber and adapted to have its center of gravity varied vertically; substantially as described.

4. In a computing-scale, the combination with the weighing-beam and independent computing-beam having its pivot adjustable with relation to the platform-lever connection, of a chamber or casing on the computing-beam having its longitudinal axis at right angles to the longitudinal axis of the beam and a gravity-weight located in said chamber and adapted to have its center of gravity varied vertically whereby the proportion of the weight below the pivot of the beam may be regulated and the sensitiveness of the balance of the beam adjusted; substantially as described.

5. In a scale the combination with the beam and platform-levers having the knife-edge bearings, of the platform-subbase resting on said bearings and having the upwardly-extending leveling projection at each corner and the platform resting on said projection; substantially as described.

6. In a scale, the combination with the beam and platform-levers having the laterally-extending knife-edge bearings, of the platform-subbase having the downwardly-extending arms coöperating with said knife-edge bearings and the upwardly-extending leveling projections one at each corner and the coöperating projections and sockets in the platform and platform-subbase for preventing the lateral movement of the platform; substantially as described.

7. In a scale, the combination with the beam, the platform-levers having the lateral knife-edge bearings, of the bifurcated platform-supporting legs having their inner sides beveled inward, the V-shaped bearings pivotally supported in said bifurcated legs with the edges above the lower edges of the inclined surfaces a sufficient distance to prevent the knife-edge bearing from entering the joint, whereby the seating of the knife-edge bearing in the V-shaped bearing is insured; substantially as described.

8. As an improved means for adjusting the gravity of scale beams or levers, a chamber carried rigid with the beam or lever and adapted to have more or less weight taken therefrom or placed therein and the center of gravity thereby varied vertically, and means for sealing the mouth of said chamber whereby the sensitiveness of the balance of the beam may be adjusted, substantially as specified.

9. As an improved means for adjusting the gravity of scale beams or levers, a chamber open at one end and carried rigid with the beam or lever, said chamber being adapted to contain weight more or less near its opening to vary its center of gravity vertically; and means for sealing the opening to said chamber whereby the sensitiveness of the balance of the beam may be adjusted, substantially as specified.

10. In a computing-scale, the combination with the weighing-beam and independent computing-beam having its fulcrum adjustable with relation to the platform-lever connection, of a chamber open at one end and carried by the computing-beam, a vertically-adjustable gravity-weight located in said chamber whereby the gravitating of the beam and the sensitiveness of its balance may be adjusted, and means for sealing the opening to said chamber and thus prevent tampering with the gravity of said beam, substantially as specified.

FRANK E. MELLINGER.

Witnesses:
O. O. OZIAS,
D. J. SMITH, Jr.